July 24, 1962  E. ENGLER  3,046,332
DEVICE FOR AUTOMATIC TRACKING OF TARGETS
Filed Jan. 13, 1960
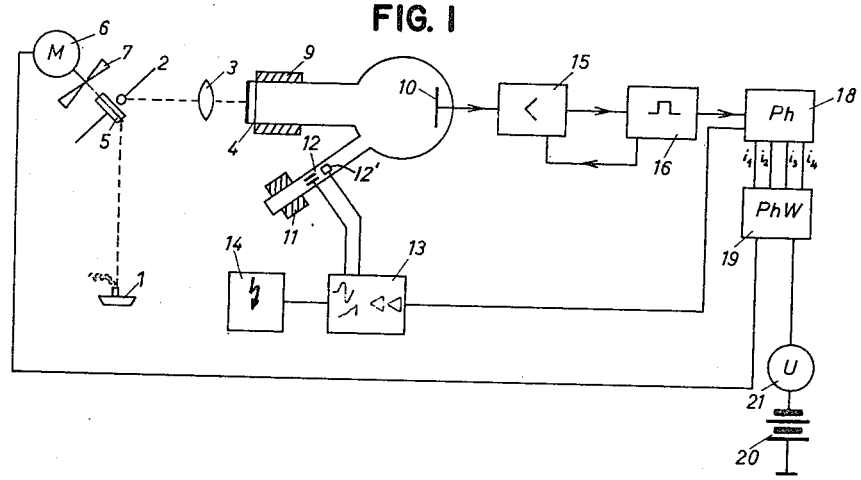
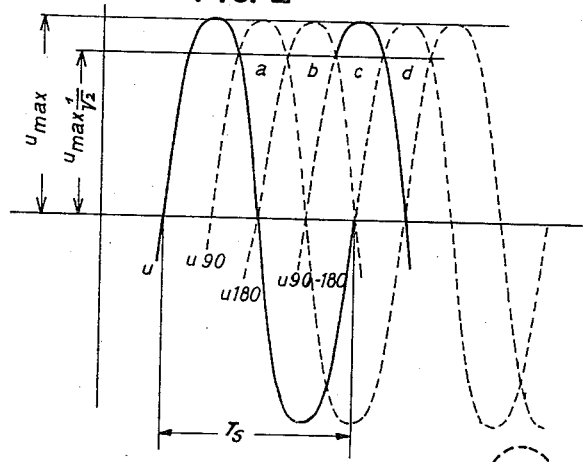
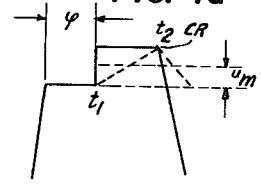
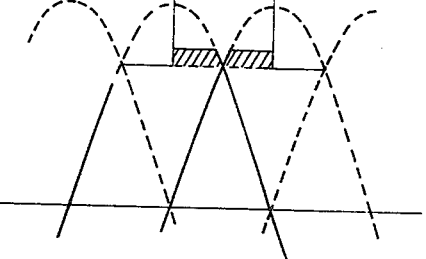
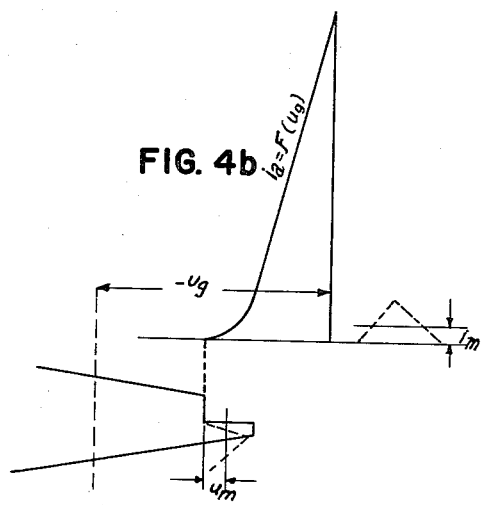
INVENTOR.
ERNST ENGLER

United States Patent Office 3,046,332
Patented July 24, 1962

3,046,332
DEVICE FOR AUTOMATIC TRACKING OF TARGETS
Ernst Engler, Nussdorf, near Uberlingen (Bodensee), Germany, assignor to Bodenseewerk Perkin-Elmer & Co., G.m.b.H., Uberlingen (Bodensee), Germany
Filed Jan. 13, 1960, Ser. No. 2,152
Claims priority, application Germany Jan. 13, 1959
8 Claims. (Cl. 178—7.2)

This invention is concerned with a device for the automatic tracking of a target and, more particularly, it relates to such a device in which use is made of an electronic-optical transducer. If a real image of the target area is produced on an electronic-optical transducer and this image is scanned by means of an electronic beam, which is controlled by scanning control voltages, image impulses are generated by the target, the phase position of these impulses compared to the phase of the scanning control voltage is characteristic for the position of the target within the target area image. If control values for a follower system of the target tracking device are deduced from this comparison of phases, it is possible to maintain the target constantly at the center of the target area image. Such an automatic target tracking device may be used for the control of an aiming or sighting mechanism, a recording theodolite, a missile, an airplane or the like.

The invention has for its object the provision of a target tracking device operating according to the principle described hereinabove and which is so designed that a reliable evaluation of the picture synchronizing impulses is ensured, so that the necessary control values may be deduced from such impulses.

The invention consists in that in the electronic-optical transducer the electronic beam is moved across the image in the form of a scanning spiral, which is effected by means of sine shaped scanning control voltages which are out of phase by 90 degrees and modulated with a sweep voltage, and that the first picture synchronizing impulse produced by the target is transformed into a rectangular impulse with constant length and amplitude by means of an impulse transformer, the duration of this transformed impulse corresponding to a quarter cycle of the control voltage. This impulse together with the control voltages is then fed into a phase comparison device.

Use of spiral type scanning permits an especially simple evaluation of the phase position of the picture impulses with respect to the scanning impulses. The picture impulses produced by the real image of the target have different forms and amplitudes which depend on the amount of the contrast, the geometric dimensions and the position of the target within the scanning spiral. Since practically only pin-point targets shall be detected by the device (or pin-point targets within more extended targets), it is ncessary in an appropriate manner to clip the frequency band of the picture impulse amplifier by the interconnection of band-pass filters. The picture impulses are further differentiated in the picture impulse amplifier so as to make them independent of the kind of the contrast (light against dark or vice versa).

Accordingly, the impulse converter will only respond to certain abrupt changes of contrast which has a substantial energy content within the band width of the picture impulse amplifier. The absolute amplitude of the picture contrast is only of subordinate importance here.

The differentiated picture impulses are converted in the impulse converter to a rectangular impulse of constant length and amplitude, which is hereinafter designated as the "standard impulse." In addition, means are provided which permit, by means of further impulses, the appropriate blanking of those portions of the target area which do not contain the target itself.

The phase position of the standard impulses is compared with the scanning sine-voltages in a phase sensitive rectifier, and the control currents for the re-setting motors are obtained from the control values so obtained.

A preferred embodiment of the present invention is illustrated schematically in the accompanying drawings and more fully described in the following detailed description from which further features and advantages of the device conceived and constructed in accordance with the present invention will be apparent.

In the drawing:

FIG. 1 is a schematic of the entire automatic tracking device.

FIG. 2 is an electrical diagram of the two scanning sine voltages which are out of phase by 90° and the rectified negative bottom loops of each, superimposed on the upper loops, and showing the clipping of the top of all four upper half-loops.

FIG. 3 shows the same clipped sine voltage upper loops and the adding thereto of a "standard impulse" from the impulse converter.

FIG. 4a shows how the part of a standard impulse coinciding with one sine voltage half-loop charges a time constant circuit, as well as the average voltage produced at the output of this circuit.

FIG. 4b is a plate current versus grid voltage diagram of one of the control tubes utilized to produce the current used for automatically moving the target image back to the center of the scanning tube; the variably applied grid voltage in the lower left part of the figure being the same clipped sine-voltage half-loop, part of a standard impulse and the time constant circuit effect thereon shown in FIG. 4a; the figure also showing the tube characteristic curve, blocking or suppressing grid voltage, and the actual and average plate current output.

FIG. 1 shows an embodiment of the invention in schematic representation in which use is made of a super-iconoscope as the electronic-optical transducer. It is, of course, understood that instead of this, transducers such as resistrons, orthicons or the like can also be used, provided that the circuit arrangement be varied accordingly.

An image of the target 1 is formed, after reflection by a plane mirror 2 suspended on gimbals (only one of the two axes being shown in the drawings), by means of an optical system 3 on the photoelectric cathode 4 of a super-iconoscope. The plane mirror 2 is driven by means of re-setting motors, preferably Ferraris motors 6 (only one of the two motors being shown in the drawing) through worm gear 5. Damping is effected by impeller wheels 7 (air damping dependent on velocity). The image converter coil 9 produces an electronic image on the scan field 10 of the super-iconoscope. Scanning is effected through an electronic beam which is focused by means of a focusing coil 11 and deflected via the deflection plates 12, 12' by means of two equal amplitude and equal frequency sweep-voltage modulated scanning sine-voltages, which are out of phase by 90 degrees, thereby effecting a spiral type of scan. The scanning sine-voltages are generated in a vacuum tube generator or oscillator 13. In order to obtain spiral scanning, the modulation of the scanning sine-voltage should have at the beginning of the sweep-voltage, a certain non-zero quantity $u_1$, so that there is a "blind spot" in the center of the spiral. The mirror control is at rest as long as the target image lies within this "blind spot." The sweep-voltage is synchronized with the scanning sine-voltages in order to obtain an upright scanning spiral. The vacuum tube generator 13 comprises means to effect the phase shift of 90 degrees as well as means which effect a distortion of the scanning sine-voltages, the latter being necessary in view of the inclined incidence of the scanning beam on the scan field of the super-iconoscope. The high voltage of 1.5 kv., which is necessary for the operation of the super-iconoscope is also generated from a scanning sine-voltage, and this is produced by high-voltage generator 14. The return of the sweep voltage is blanked. A picture impulse amplifier 15 with trimmed frequency band amplifies and differentiates the picture impulses supplied by the super-iconoscope. Following the picture impulse amplifier (15) is an impulse converter 16 which converts the picture impulses produced by the target image into standard impulses. In phase comparison device 18, which follows, the phase of the standard impulses is compared with the scanning sine-voltages. Direct currents $i_1$, $i_2$, $i_3$ and $i_4$, which are proportional to the phase position of the standard impulse with respect to the scanning sine-voltages (and thus to the respective angular deflection of the target image from the optical axis of the super-iconoscope which points generally towards the target), are now generated in the anode circuits of four control tubes. With the aid of a phase converter 19 the direct control voltages $i_1$, $i_2$, $i_3$ and $i_4$ are used for shifting the phase of an exciting voltage of the Ferraris motors 6. The current supplied from battery 20 is fed into the transformer 21 which latter supplies a voltage of 36 volts at a frequency of 500 cycles which—after conversion into a three-phase voltage—serves as the operating voltage for the Ferraris motors 6.

The mirror 2 is so controlled by means of the Ferraris motors 6 that the image of the target 1 is always maintained in the center of the image field, i.e., in the "blind spot" of the scanning spiral.

The operation of the phase comparison system is as follows: If one regards, in FIG. 2 of the drawings, the time slope of the scanning sine-voltages $u_0$ and $u_{90}$ within the course of one spiral loop $T_s$ and their respective rectified voltages $u_{180}$ and $u_{90-180}$ which are out of phase by 180 degrees, it becomes apparent that each of these voltages has the same momentary value $u_{max}$ after each lapse of ¼ cycle. If now the four voltages shown in FIG. 2 are trimmed at the point $$\frac{1}{\sqrt{2}} u_{max}$$

one obtains within the course of one spiral loop four adjacent distances $a$, $b$, $c$, and $d$ of equal length. If now an impulse having the length ¼$T_s$ is deduced by means of the impulse converter 16 from the front side of the picture impulse produced by the target image, this impulse—the standard impulse mentioned—will be, in accordance with the phase position, temporarily with a more or less great portion within such a cut off portion of a scanning sine-voltage. The standard impulse is added to the trimmed scanning sine-voltages. When a cophasal state between a scanning sine-voltage and the standard exists, the whole duration of the standard impulse will be added to one of these sine-voltage half-waves; however, in the event of a phase shift only a portion of the duration of the standard impulse coincides with the halfwave of the scanning sine-voltage. In the latter case, a portion of the standard impulse partly overlaps and should be partly added to two adjacent scanning sine-voltages following in time sequence. The trimmed scanning sine-voltages $u_0$, $u_{90}$, $u_{0-180}$ are shown in FIG. 3, the standard impulse being added to two adjacent trimmed scanning sine-impulses. The portion of the standard impulse added to the trimmed scanning sine-voltages is now used for the charging of a time constant member CR, the mean voltage value $U_m$ of which is proportional to the phase shift $\varphi$ (see FIG. 4a). One control tube having a time constant member CR connected across its grid circuit is assigned to each of the scanning sine-voltages $u_0$, $u_{90}$, $u_{0-180}$, $u_{90-180}$. Each control tube (see FIG. 4b) is originally blocked by means of a high negative biasing potential $u_g$ and is modulated by means of one of the four trimmed scanning sine-voltages almost up to its bend of characteristic. If now there occurs a charging of its time constant member CR, which is due to a standard impulse, simultaneously with a trimmed scanning sine-voltage (as shown at the bottom of FIG. 4b as well as in FIG. 4a), a current impulse is produced in the anode circuit of this tube the value of which depends on the phase angle $\varphi$ (see FIG. 4a). Normally, standard impulses will be periodically generated during the mirror re-setting operation so that a certain direct current mean value occurs in the anode circuit of each control tube. No standard impulses will occur after the mirror has been adjusted so that the optical axis is exactly aligned with the target; the anode currents of all control tubes will then be zero.

Although there is direct relation between the phase angle $\varphi$ and the mean value of the anode current $i_1$, $i_2$, $i_3$, and $i_4$ there is no linear dependence because of the interconnection of predominantly exponential members.

Moreover, use is made in the device according to the invention of the fact that it is possible by means of further impulses electrically to block and therefore blank a portion of the target area which does not contain by the target image. This may be of considerable importance during the setting of the device and if several targets are present. During the initial setting up of the device care is taken by mechanical adjustment that the target to be tracked will be as close as possible to the origin of the scanning spiral. A blocking impulse (independent blocking impulse) is now introduced into the device to blank that portion of the target area which is not filled up by the target. Since the target to be tracked is now next to the origin of the scanning spiral and since only the first picture impulse is passed by the band-pass filters in the impulse amplifier 15 to actuate the impulse converter, standard impulses will now occur at the target to be tracked, and the independent blocking impulses are now replaced by such blocking impulses which are positively released by the standard impulses (dependent blocking impulses). The dependent blocking impulses move during the mirror re-setting operation together with the target image (or more explicitly the standard impulses produced by the target), in the direction towards the "blind spot." The greatest portion of the target area which does not contain the target is thus blanked and all secondary targets are then ineffective.

I claim:
1. A device for automatic determination of the direction of a target from a tracking axis of the type having means for forming a real image of the area surrounding and including said target on the collector electrode of an optical to electronic transducer in which said transducer has means including deflector plates for electronic scanning of said image to produce an electrical signal representative of the significant characteristics of said image; said means for electronic scanning comprising means for producing on the scanning deflection plates two sine voltages 90° out of phase with each other and a sweep voltage modulating each of said sine voltages so that a spiral scan is effected on said collector electrode, said real image being initially so positioned on said electrode that the image of said target is positioned near the center of said scan spiral; means for amplifying and differentiating the first electrical signal formed by each spiral scan so as to produce a first impulse therefrom, said first signal being produced by that significant characteristic of the target area image lying nearest the center of said spiral scan and therefore being representative of the target intended to be tracked; means for converting said first impulse into a standard impulse of a predetermined amplitude and duration; and means for comparing the phase of said standard impulse with that of each of said scanning sine voltages and for producing at least one control signal the magnitude of which increases in accordance with coincidence of phase relation between said standard impulse and one of said scanning sine voltages, said control signal thereby being representative of the direction determined by said phase comparison means and of the direction which the target image and the center of said spiral scan should be moved relative to each other in order to make them coincident.

2. A device for automatic determination of the direction of a target from a tracking axis according to claim 1, in which said means for converting said first impulse into a standard impulse has a threshold value sufficient to suppress target area image characteristics below a certain contrast change, thereby rejecting non-significant characteristics of said image.

3. A device for automatic determination of the direction of a target from a tracking axis according to claim 1, in which independent blocking means are initially provided in the form of pulses to suppress the parts of the scan field remote from the center of the collector electrode; and dependent blocking means are subsequently generated by the means for converting said first impulse into a standard impulse so that after the first impulse is received further impulses during the same spiral scan will be suppressed in the amplifying and differentiating means.

4. A device for automatic determination of the direction of a target from a tracking axis of the type having means for forming a real image of the area surrounding and including said target on the collector electrode of an optical to electronic transducer in which said transducer has means including deflector plates for electronic scanning of said image to produce an electrical signal representative of the significant characteristics of said image; said means for electronic scanning comprising means for producing on the scanning deflection plates two sine voltages 90° out of phase with each other and a sweep voltage modulating each of said sine voltages so that a spiral scan is effected on said collector electrode, said real image being initially so positioned on said electrode that the image of said target is positioned near the center of said scan spiral; means for amplifying and differentiating the first electrical signal formed by each spiral scan so as to produce a first impulse therefrom, said first signal being produced by that significant characteristic of the target area image lying nearest the center of said spiral scan and therefore being representative of the target intended to be tracked; means for converting said first impulse into a standard impulse of a predetermined amplitude and of a duration substantially equal to one-quarter cycle of the scanning sine voltage; means for full-wave rectifying each of said two scanning sine voltages so as to produce therefrom four half-wave sine voltages each having a 90° phase difference; and means for comparing the phase of said standard impulse with that of each of said half-wave sine voltages and for producing at least one control signal the intensity of which increases in accordance with coincidence of phase relation between said standard impulse and one of said half-wave sine voltages, said control signal thereby being representative of the direction which the target image and the center of said spiral scan should be moved relative to each other in order to make them coincident.

5. A device for automatic determination of the direction of a target from a tracking axis of the type having means for forming a real image of the area surrounding and including said target on the collector electrode of an optical to electronic transducer in which said transducer has means including deflector plates for electronic scanning of said image to produce an electrical signal representative of the significant characteristics of said image; said means for electronic scanning comprising means for producing on the scanning deflection plates two sine voltages 90° out of phase with each other and a sweep voltage modulating each of said sine voltages so that a spiral scan is effected on said collector electrode, said real image being initially so positioned on said electrode that the image of said target is positioned near the center of said scan spiral; means for amplifying and differentiating the first electrical signal formed by each spiral scan so as to produce a first impulse therefrom, said first signal being produced by that significant characteristic of the target area image lying nearest the center of said spiral scan and therefore being representative of the target intended to be tracked; means for converting said first impulse into a standard impulse of a predetermined amplitude and of a duration substantially equal to one-quarter cycle of the scanning sine voltage; means for full-wave rectifying each of said two scanning sine voltages so as to produce therefrom four half-wave sine voltages each having a 90° phase difference; means for clipping said four half-wave sine voltages; means for adding said standard impulse to said clipped half-wave sine voltage while preserving the relative phase relationships therebetween so that parts of said standard impulses are added only to the one or two of the four half-wave sine voltages which correspond, at least in part, to the same quadrant of phase as the standard impulse; means for separating said modified four clipped half-wave sine voltages including the added standard impulse parts; and four output means, each having control means to which one of said modified clipped half-wave sine voltages is applied, each of said output control means also having negative bias of such degree that a clipped half-wave sine voltage without any part of the standard impulse added thereto is insufficient to overcome said negative bias therefore producing no output signal, but said negative bias being of a sufficiently low value that each output means receiving a half-wave sine voltage with some part of a standard impulse on its control means will produce a signal, the strength of which will be dependent on the fraction of said standard impulse which coincides with the clipped half-wave sine voltage which is applied to its control means, said four output means thereby producing signals representing the direction which the target image and the center of said spiral scan should be moved in order to make them coincident.

6. A device for automatic determination of the direction of a target from a tracking axis according to claim 5, in which said means for clipping said half-wave sine voltages is of such construction as to pass clipped half-wave sine voltages of value $$\frac{1}{\sqrt{2}}U_{max}$$

where $U_{max}$ is the original maximum voltage value of the unclipped sine voltages, thereby forming four clipped half-wave sine voltages, each differing by 90° in phase and each having a flat top portion extending for 90° of their wave length.

7. A device for automatic determination of the direction of a target from a tracking axis according to claim 5, in which a time constant (CR) means is positioned between said control means of the output means and said applied modified clipped half-wave sine voltage so that a mean value of the part of the applied standard impulse reaches said control means thereby to yield a mean output, thereby eliminating any transient surge in the output signal.

8. A device for automatic tracking of targets of the type having means for forming a real image of the area surrounding and including said target on the collector electrode of an optical to electronic transducer in which said transducer has means including deflector plates for electronic scanning of said image to produce an electrical signal representative of the significant characteristics of said image; said means for electronic scanning comprises means for producing on the scanning deflection plates two sine voltages 90° out of phase with each other and a sweep voltage modulating each of said sine voltages so that a spiral scan is effected on said collector electrode, said real image being initially so positioned on said electrode that the image of said target is positioned near the center of said scan spiral; means for amplifying and differentiating the first electrical signal formed by each spiral scan so as to produce a first impulse therefrom, said first signal being produced by that significant characteristic of the target area image lying nearest the center of said spiral scan and therefore being representative of the target intended to be tracked; means for converting said first impulse into a standard impulse of a predetermined amplitude and duration; means for comparing the phase of said standard impulse with that of each of said scanning sine voltages, and for producing at least one control output the magnitude of which increases in accordance with coincidence of phase relation between said standard impulse and one of said scanning sine voltages, said control output thereby being representative of the direction which the target image and the center of said spiral scan should be moved relative to each other in order to make them coincident; motive means actuated by said output means; and target area image moving means, operatively connected to said motive means, for centering the target on said spiral scan.

References Cited in the file of this patent
UNITED STATES PATENTS

| | | |
|---|---|---|
| 2,403,975 | Graham | July 16, 1946 |
| 2,734,269 | Claret | Feb. 14, 1956 |
| 2,917,737 | Close | Dec. 15, 1959 |
| 2,938,949 | Vosburgh | May 31, 1960 |